INVENTORS
WILLIAM V. GOODHUE
FRANK W. HIGGINS

July 17, 1962 W. V. GOODHUE ET AL 3,044,722
WINDING MACHINE
Original Filed April 26, 1951 5 Sheets-Sheet 2

Inventors
WILLIAM V. GOODHUE
FRANK W. HIGGINS
By Albert P. Davis
Attorney

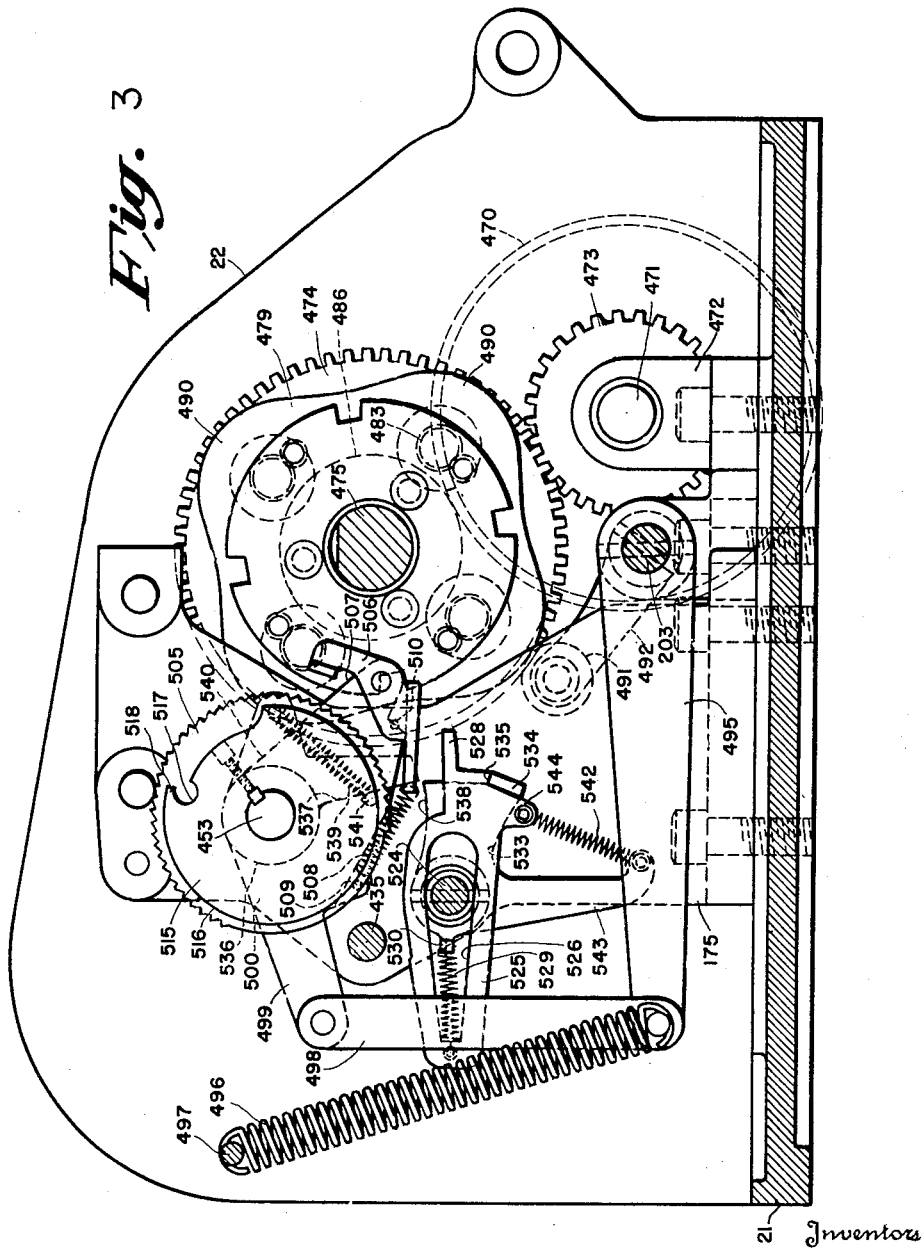

July 17, 1962    W. V. GOODHUE ET AL    3,044,722

WINDING MACHINE

Original Filed April 26, 1951    5 Sheets-Sheet 4

Inventors
WILLIAM V. GOODHUE
FRANK W. HIGGINS

By *Albert P. Davis*

Attorney

United States Patent Office 3,044,722
Patented July 17, 1962

3,044,722
WINDING MACHINE
William V. Goodhue, North Kingstown, R.I., and Frank W. Higgins, Wareham, Mass., assignors to Leesona Corporation, a corporation of Massachusetts
Original applications Apr. 26, 1951, Ser. No. 223,022, now Patent No. 2,764,362, dated Sept. 25, 1956, and Apr. 27, 1956, Ser. No. 581,145, now Patent No. 2,930,543, dated Mar. 29, 1960. Divided and this application Nov. 13, 1959, Ser. No. 859,083
5 Claims. (Cl. 242—39)

This invention relates to winding machines for winding yarn or like strandular materials into cops, cones and other forms of packages and is a division of our copending application Serial No. 223,022, filed April 26, 1951 now Patent No. 2,764,362, and Serial No. 581,145 filed April 27, 1956, now Patent No. 2,930,543.

In the present specification and claims the term "yarn" is used in a general sense to designate all types of attenuated materials and the term "package" is employed for convenience of description to apply to any usual form of wound mass.

In general, the object of the invention is to provide a fully automatic winding machine, requiring practically no attention on the part of the operator during its normal operation except to remove the fully wound packages and apply cop-tubes or other yarn-carriers to the holders therefor.

Further objects of the invention are set forth in the following specification which describes a preferred form of construction of the winding machine by way of example as illustrated by the accompanying drawings. In the drawings:

FIG. 3 is an elevational view illustrating the means for driving the cam-shaft, the continuously driven oscillator on the cam-shaft, and the package-lifting mechanism located within the main frame of the winding unit;

The present invention is herein shown and described as embodied in a winding machine of the drum-driven type in which the winding package is driven by surface contact with a rotating drum or drive-roll, preferably a grooved traversing roll for distributing the yarn on the package. It is to be understood, however, that the invention is also applicable to use with other types of winding units, for example, precision winders in which the package is rotated by a positively-driven spindle and the yarn distributed thereon by a reciprocating traversing guide.

*Main Elements of the Winding Units*

The present embodiment of the invention is illustrated in connection with a winding unit of the type fully disclosed in United States Patent No. 2,764,362 embodying a helically grooved drive-roll for rotating the package by peripheral contact therewith and simultaneously traversing the yarn longitudinally thereof; a winding spindle carrying a rotary mandrel or holder for the cop-tube or other package-core; and means for movably supporting the winding spindle to adapt the package to contact with the periphery of the drive-roll and permit the package core to recede therefrom as the yarn builds up on the core. Since the construtcion and operation of these elements is fuly explained in said Patent No. 2,764,362 only so much of their construction and operation as is necessary to a complete understanding of the present invention is presented herein.

Figure 1:
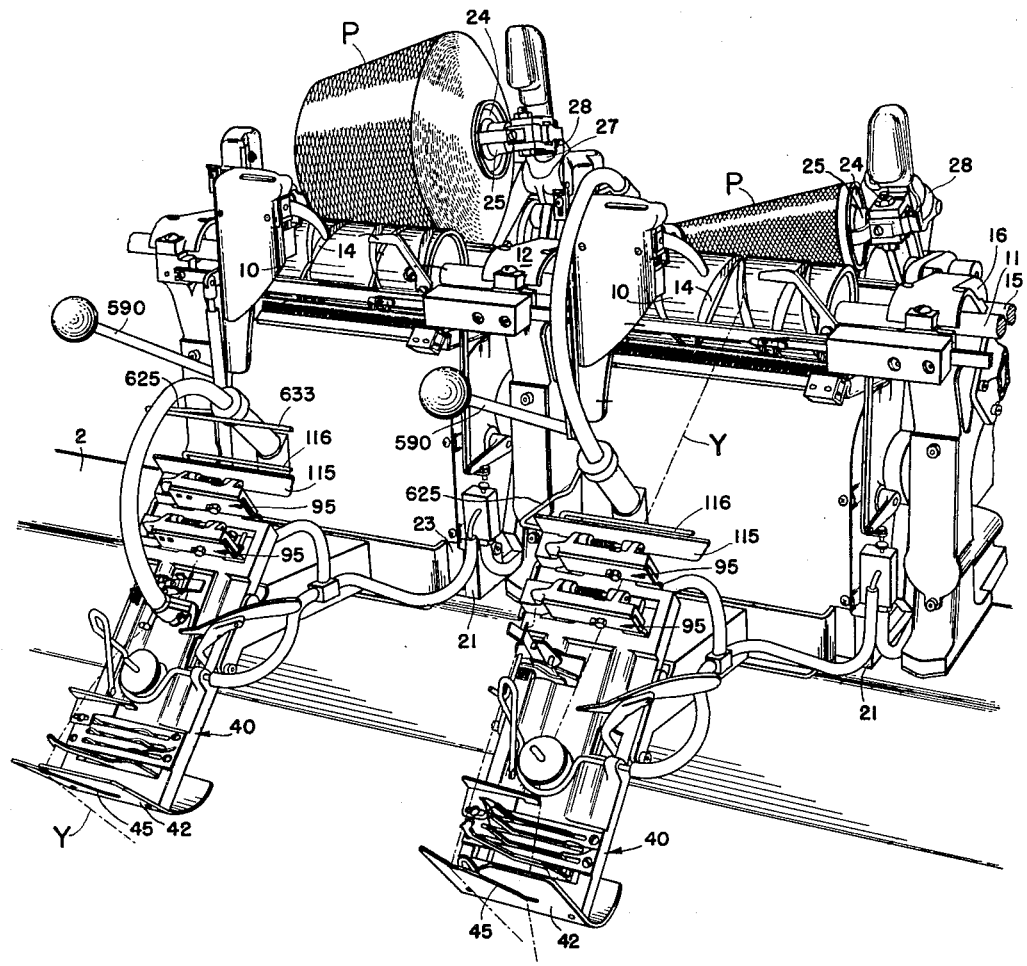
FIG. 1 is a perspective view illustrating two of the winding units of a gang machine shown in their operative relationship and mounted on a bed which may be supported from the floor by suitable standards or legs.

Referring particularly to FIG. 1, the individual winding units may be arranged in any suitable number, for example six, spaced along each side of the bed 2. The bed 2 may be constructed of angle-irons or plates to provide a frame-work supported from the floor. A drive-shaft 5, FIG. 2, extends the whole length of the machine, being journaled in suitable bearings 6 fastened to the bed 2. Power-transmission means are enclosed in a casing, not shown, at the head end of the gang machine with power taken from a suitable source such as an electric motor wthin the casing. A series of drive-rolls 10 are mounted fast on a horizontal shaft 11 that extends longitudinally of the gang and is driven continuously from the power-transmission means in the end casing with the rolls disposed in spaced relationship corresponding to the spacing of the winding spindles of the several units. The roll-shaft 11 is journaled in bearings 12 on a plurality of spaced brackets 13 rising from the bed 2.

A second horizontal shaft 15, constituted as a "reverse-roll," is also journaled in stationary bearings 16 on the several brackets 13. The reverse-roll shaft 15 is likewise driven continuously from the power-transmission means in the casing at the head end of the gang machine, being rotated in the opposite direction from that of the drive-roll shaft 11. The reverse-roll shaft 15 is at the rear of the drive-roll shaft 11, see FIG. 2, and arranged slightly therebelow in position to adapt the winding package to be transferred into peripheral engagement therewith for rotating it therefrom in a direction opposite to its rotation during the winding of the package. It thus will be understood that when the package P is transferred into surface contact with the reverse-roll shaft 15 it will be driven in a direction to unwind the yarn to assist in drawing off the broken end from the package by means described in Patent No. 2,764,362.

As herein illustrated, each winding unit of the machine is adapted for winding a conical package rotated by surface contact with its respective drive-roll 10; each drive-roll being formed with helical grooves 14 extending in opposite directions and crossing each other which receive the strand of yarn and traverse it from end to end of the package in a manner well known to those versed in the art. The packages or cones P are wound on conical paper tubes C that serve as cores for supporting the yarn mass. The cop-tubes or cores C are suitably held on winding mandrels or cop-holders 24, each rotatably mounted on a winding spindle 25 supported by a pivoted arm 26. The support or pivoted arm 26 for the cop-holder 24 may be of usual construction having an extension rod 27, see FIG. 2, rotatably held in a bearing 28 pivoted on a stud-shaft 29 to adapt the arm to swing upwardly and permit the winding spindle to recede from the drive-roll 10 during the building of the package on the cop-tube C. The stud-shaft 29 is supported at the end of a link 30 fixedly mounted on the end of a shaft 31 extending through bearings in the sides 22 and 23 of the frame 20, see FIG. 2. The extension rod 27 is adapted to turn in its bearing 28 to allow the winding spindle 25 to tilt or cant with respect to the axis of the drive-roll 10 so that as the taper of the package changes during the winding its surface will be maintained in full contact with the periphery of the roll. The bearing 28 is mounted fast on a sleeve 33 which is rotatable on the stud-shaft 29. The sleeve 33 fits snugly in an axial bore in the bearing 28 and the bearing is clamped to the sleeve by means of a pair of slidable plug-like bushings 35 in a transverse bore which are drawn together by a screw 36. The adjacent ends of the bushings 35 are milled with concavities for engaging frictionally with the periphery of the sleeve 33 to clamp the bearing 28 thereto when the screw 36 is tightened.

Figure 2:
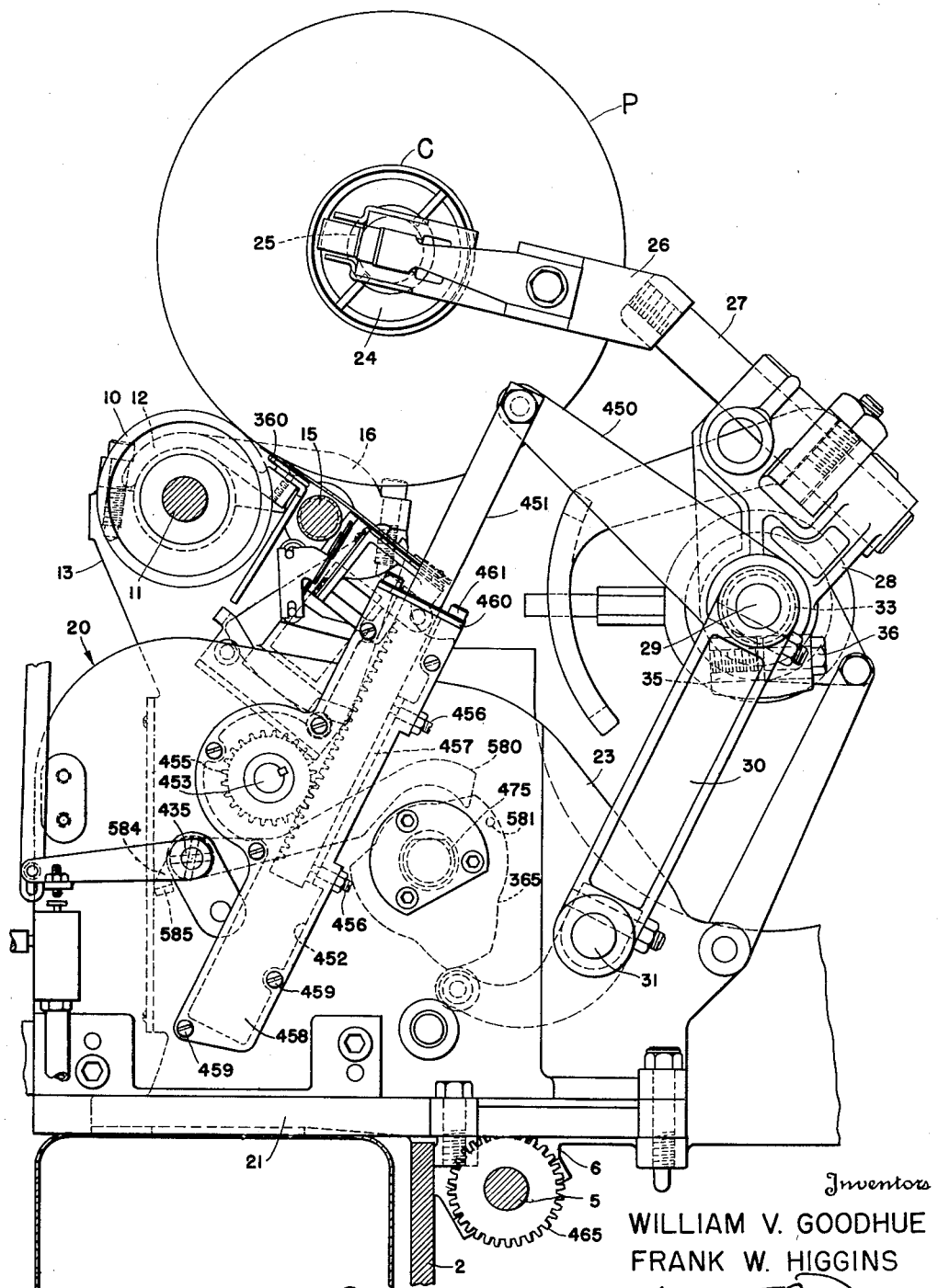
FIG. 2 is a side elevation of one unit of the gang machine showing its principal winding elements comprising the traversing drive-roll, the spindle on which the winding package is supported, and the pivoted arm carrying the spindle to adapt it to move toward and away from the drive-roll.

It has been stated that as the yarn is wound on the cop-tube C the winding spindle 25 recedes from the drive-roll 10 with the increase in diameter of the winding mass with the arm 26 swinging upwardly about its pivot on the stud-shaft 29, see FIGS. 1 and 2. To arrest the winding operation when the package reaches its predetermined diameter the arm 26 is swung upwardly positively to lift the package off from the drive-roll 10 through the operation of means next described. Fast on the end of the sleeve 33 to which the bearing 28 for the arm 26 is clamped is a lever 450, see FIG. 2, having its outer end pivotally connected to a rack-bar 451 that is slidably supported in a casing 452. The casing 452 is rockably mounted on the end of a horizontal shaft 453 journaled in a bearing in the side wall 23 of the frame 20 and a second bearing in a standard 175, see FIG. 3, rising from base 21 of frame 20. The shaft 453 carries a spur-gear 455 with its teeth in mesh with those on the rack-bar 451 whereby through the rotation of the gear the rack-bar may be slid upwardly to rock the lever 450 and thereby raise the arm 26 to lift the package off from the drive-roll 10. The rack-bar 451 is adjustably held with its teeth in proper mesh with the teeth on the gear 455 by means of a pair of studs 456 engaging a guide or wear-plate 457 that bears against the side of the bar to take the thrust of the gear. Suitable nuts on the ends of the studs 456 are set up against the casing 452 to lock the studs in adjusted position. A sheet-metal cover 458 attached to the open side of the casing 452 by screws 459 and a cap 460 fastened at its upper end by screws 461 protect the parts from lint and dirt; the cap 460 having a slotted opening through which the rack-bar 451 slides. A gasket, not shown, may be inserted between the cap 460 and the top of the casing to seal the opening through the cap and prevent lubricant from escaping at this point.

Rotation of the shaft 453 to turn the gear 455 and raise the rack-bar 451 to lift the package off from the drive-roll 10 for arresting the winding operation is accomplished by means, later described, actuated when the package reaches its predetermined diameter. To regulate the size of the package as desired the angular relation between the arm 26 which supports the package and the lever 450 may be altered by adjusting the bearing 28 around the sleeve 33. By unscrewing the bolt 36 the clamping plugs 35 may be released for turning the bearing 28 to adjust the arm 26 toward or away from the lever 450 so that the package P will be lifted off from the drive-roll 10 by the rack-bar 451 at an earlier or later stage in the winding operation to thereby control its size.

Figure 4:
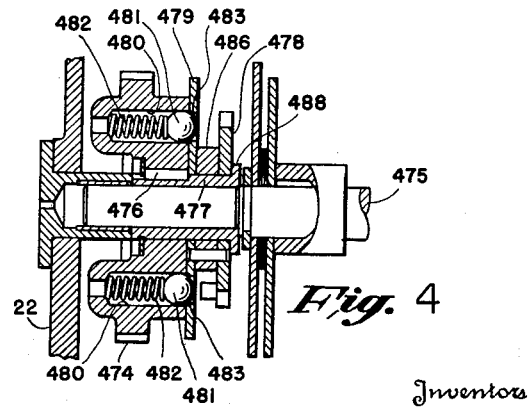
FIG. 4 is a front sectional view showing the yieldable clutch-means between the driving gear and the drive-plate for the cam-shaft.

As before indicated, automatically-operated means are provided for arresting the winding operation when the package reaches its predetermined size. The stopping mechanism is energized through connections actuated by the horizontal shaft 5, see FIG. 2, that is driven continuously from the power-means at the head end of the gang machine. The shaft 5 carries a spur-gear 465 for each unit of the gang machine, the gears being secured fast on the shaft by any suitable means. Each gear 465 meshes with a gear 470 fast on a stud-shaft 471 journaled in a suitable bearing in the wall 22 of the frame 20 of a winding unit and a bearing bracket 472, shown in FIG. 3, fastened to the base 21 of the frame. The stud-shaft 471 carries a smaller spur-gear 473 fast thereon at its opposite end and arranged in mesh with a larger gear 474. The gear 474 is normally rotatable on a horizontal shaft 475 journaled in bearings in the side walls of the frame 20 and constituted as the cam-shaft for the control-unit of the machine, see FIG. 3. Referring to FIG. 4, the gear 474 is keyed at 476 to a bushing 477 rotatable on the reduced end of the cam-shaft 475 and serves as a driver for an element 478, termed for convenience the "drive-plate" for the control-unit. The gear 474 is drivingly connected to a cam 479, called the oscillator-cam, and the drive-plate 478, preferably by ball-clutch means to adapt the connection to yield or be released under an abnormal increase in torque due to accident or obstruction to the movement of any of the driven parts including the control-cams. For this purpose the gear 474 is provided with a plurality of circumferentially-spaced pockets 480 slidably mounting balls 481 which are urged by helical springs 482 to engage in appropriate openings 483 in the disk-cam 479. The cam 479 is connected by rivets to the drive-plate 478 with a spacer-collar 486 therebetween. The collar 486 with its connected elements is rotatably mounted on the bushing 477 with the parts held from axial movement by a flange 488 at the end of the bushing. It will thus be understood that the gear 474 which is driven continuously from the lower drive-shaft 5, previously mentioned, is normally connected to drive the cam 479 throughout the continuous operation of the winding unit.

The cam 479 serves as the prime-mover for actuating the stopping mechanism of the machine through connections described below that are thrown into operation when the package reaches its predetermined size. Referring to FIG. 3 the peripheral contour of the cam 479 is substantially quadrilateral with four rounded lobes 490 spaced equidistantly therearound. Engaging the periphery of the cam 479 is a roller 491 carried at the end of a forked lever 492 secured fast on the rock-shaft 203, previously mentioned, and supported in bearings in the bracket 472 and the end wall 23 of the frame 20. A second longer lever 495 also secured fast on the rock-shaft 203 extends rearwardly therefrom with a helical spring 496 connected to its end and anchored at its opposite end by a pin 497 in the side wall 23 of the frame 20, see FIG. 5. The outer end of the lever 495 is pivotally connected to a link 498 having a pivotal connection at its upper end to an arm 499 extending from a member 500, termed an "oscillator" and somewhat similar to a "walking-beam," which is rockably mounted on the transverse shaft 453, previously mentioned. The spring 496 maintains the roller 491 in engagement with the periphery of the cam 479 which acts to rock the shaft 203 and lever 495 and thereby continuously oscillate the walking-beam or oscillator 500.

The shaft 453 carries fast thereon a ratchet-wheel 505 employed for rotating the gear 455, previously mentioned as meshing with the rack-bar 451, see FIG. 2, for sliding the bar to raise the cop-holder carrying arm 26 and lift the package off from the drive-roll 10. The ratchet-wheel 505 is rotated in contraclockwise direction, as viewed in FIG. 3, to turn the gear 455 and lift the package off from the drive-roll 10 through the operation of a pawl 506 pivoted at the end of one arm 507 of the walking-beam or oscillator 500. A helical spring 508 hooked into the tail end of the pawl 506 has its opposite end fastened to a pin 509 on the oscillator 500, thereby normally tending to maintain the pawl disengaged from the ratchet-wheel 505 as shown in FIG. 3. The pawl 506 carries a pin 510 projecting from its side and adapted to be engaged by means later described to rock the pawl into engagement with the teeth of the ratchet-wheel 505. With the pawl 506 engaged with the ratchet-wheel 505, see FIG. 6, the rocking motion of the oscillator 500 will actuate the pawl to turn the ratchet-wheel and thereby rotate the gear 455 to slide the rack-bar 451 and lift the package off from the drive-roll 10.

At the side of the ratchet-wheel 505 is a disk 515 secured fast to the shaft 453 and formed with a peripheral face 516 of substantial width which is generally cylindrical throughout substantially two hundred and seventy degrees of its circumference. Interrupting this cylindrical face of the disk 515 its periphery is recessed to provide a circular face of less diameter terminating in a notch 517 which forms a radial shoulder 518. A curved lever 520 has its hub secured fast on the rock-shaft 435, previously mentioned, and terminates in a right-angular projection 521, the end of which normally rides on the peripheral face 516 of the disk 515, see FIG. 5. It will be understood that as the arm 26 carrying the winding mandrel 24 rises with the growth in diameter of the package, see FIG. 2, the gear 455 will be rotated by the rack-bar 451 to turn the shaft 453 and the disk 515 fast thereon. As the package reaches its predetermined diameter the disk 515 will have been turned sufficiently to carry its shoulder 518 past the projection 521 on the end of the lever 520 to permit it to drop into the notch 517. The lever 520 will thus be released to move in clockwise direction to rock the shaft 435, see FIG. 6, and initiate the operation of instrumentalities, later described, for arresting the operation of the machine. The lever 520 is released from engagement with the shoulder 518 on the disk 515 by rocking the shaft 535 through manual operation of the starting mechanism of the machine as later explained.

Figures 6, 7:
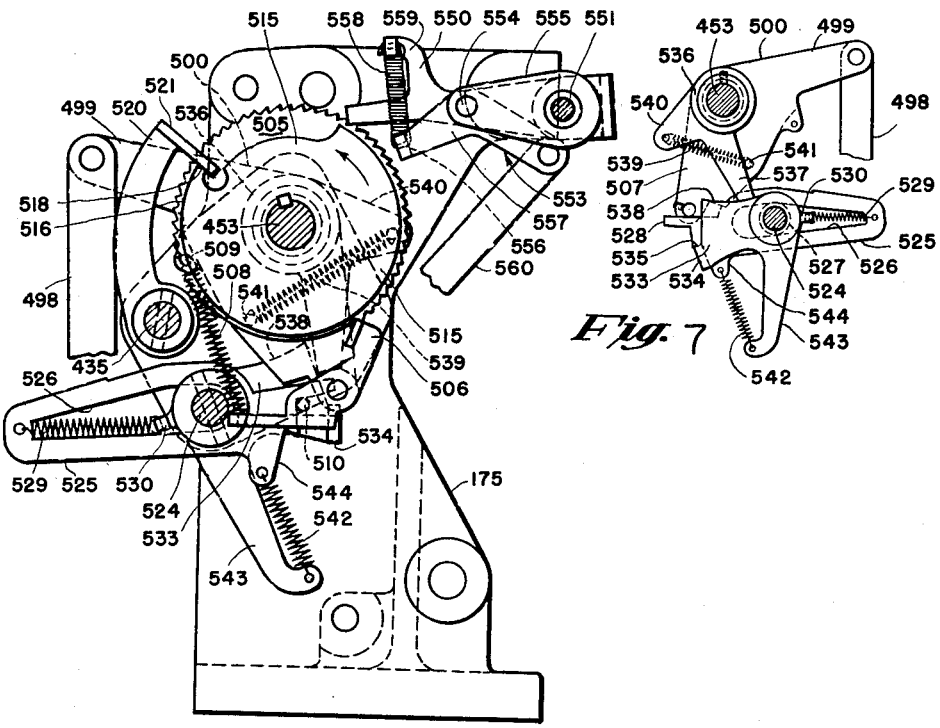
FIG. 6 is a similar view showing the package-lifting pawl engaged with the teeth on the ratchet-wheel to rotate the wheel and the hold-back pawl also engaged therewith.
FIG. 7 is a detailed view of the anvil and trigger mechanism for controlling the operation of the package-lifting mechanism.
Figure 5:
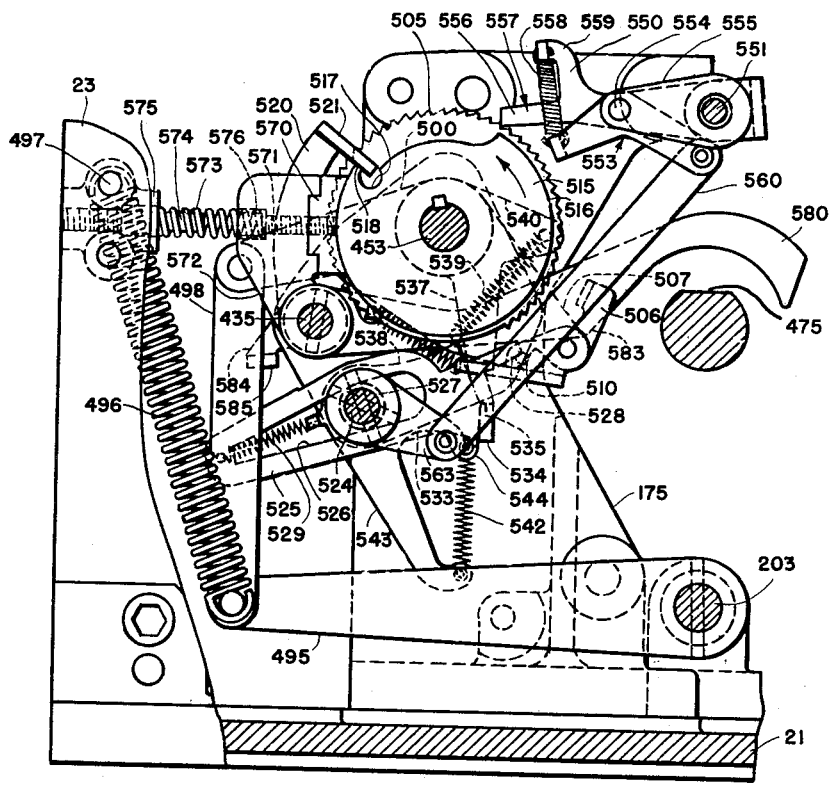
FIG. 5 is a detailed elevational view showing certain of the parts of the package-sizing mechanism.

The ratchet-advancing pawl 506 is carried into engagement with the teeth on the ratchet-wheel 505 by means shown in FIGS. 5 and 6 and next described. A horizontal shaft 524 is rockably mounted in the side wall 23 of the frame 20 and a bearing in the central standard 175. Slidably and rockably mounted on the rock-shaft 524 is a member 525, called a "trigger," formed with an elongate slot 526 through which the shaft projects. The forward portion of the slot 526 is of a width to adapt it to enclose a sleeve 527, shown by dotted lines in FIG. 7, on the shaft 524 while its rearward portion is tapered throughout the remainder of its length. The forward end of the trigger is formed with a horizontal projection or shelf 528 which functions to control the operation of the pawl 506 in the manner as later explained. A helical spring 529 attached to the rearward end of the trigger 525 has its opposite end connected to a lug 530 on the hub of a member 533 called the "anvil" which is mounted fast on the shaft 524. The spring 529 tends to slide the trigger 525 forwardly, or to the right as viewed in FIG. 5.

Referring more particularly to FIG. 7, the anvil 533 is disposed alongside the trigger 525 and formed with a right-angular extension or ear 534 adapted to be engaged by a detent-shoulder 535 below the shelf 528 at the end of the trigger whereby to latch the parts in connected relationship. Free to turn on the shaft 453 which carries the oscillator 500 is a so-called safety lever 536 having a downwardly-projecting arm 537 with its end of arcuate contour to adapt it to slide back and forth above the curved upper edge 538 of the anvil 533. The safety lever 536 is employed as a precautionary measure to prevent the anvil 533 from being rocked until the pawl 506 is in proper relation to the trigger to effect its engagement with the teeth on the ratchet-wheel 505. A spring 539 normally maintains the lever 536 in the postion shown in FIG. 7 with its arm 537 engaged against a pin 541 projecting from the side of the oscillator 500. The spring 539 is fastened to the lateral arm 540 of the lever 536 and anchored to the pin 541 on the oscillator 500. The safety lever 536 moves with the oscillator 500 at each stroke to the right or contraclockwise, as viewed in FIG. 3, the end of its arm 537 reaches a position beyond the end of the curved upper edge 535 of the anvil 533. It is therefore only when the safety lever 536 is in this position as shown in FIG. 6 that the anvil 533 will be permitted to be rocked by the shaft 524. Then at the next oscillation of the oscillator 500 in the opposite direction the end of the arm 537 will engage its end with the end of the anvil 533 to cause the arm to be held against the tension of the spring 539 to stretch the latter as the pin 541 recedes from the arm. A spring 542 connected to the downwardly-projecting arm 543 of the anvil 533 and anchored to an ear 544 on the trigger 525 tends to maintain the anvil and trigger locked together in the relationship shown in FIG. 7.

During the normal operation of the machine the spring 508 holds the pawl 506 in disengaged position with the pin 510 on its side elevated above the shelf 528 on the trigger 525. When the anvil 533 is rotated in contraclockwise direction, as viewed in FIG. 5, the trigger 525 will be rocked in the same direction so that the shelf 528 will be elevated above the pin 510 on the pawl 506. The next oscillation of the oscillator 500 will therefore cause the pin 510 to ride in under the shelf 528 and engage with the vertical edge therebelow to slide the trigger 525 to the left as shown in FIG. 6 so as to disengage the shoulder 535 on the trigger from the ear 534 on the anvil 533. At this juncture the spring 542 will rock the trigger 525 downwardly to cause the shelf 528 through its contact with the pin 510 to rock the pawl 506 contraclockwise and engage it with the teeth on the ratchet-wheel 505.

It has been stated that the oscillator 500 is rocked or oscillated continuously by the cam 479 driven from the power-shaft 5. Therefore it will be understood that when the pawl 506 is carried into position to engage one of the teeth on the ratchet-wheel 505 it will be reciprocated by the oscillator to turn the ratchet-wheel and thereby the gear 455, see FIG. 2, to slide the rack-bar 451 upwardly. The rack-bar 451 will thereby swing the arm 450 in clockwise direction as viewed in FIG. 2 to raise the arm 26 for lifting the package P off from the drive-roll 10 so as to arrest its rotation. In this way the winding of the yarn on the package P is arrested when the latter reaches its predetermined diameter. To prevent the ratchet-wheel 505 from turning in the opposite direction and allow the rack-bar 451 to descend, a hold-back pawl 550 is provided for engaging the teeth on the ratchet-wheel.

The hold-back pawl 550, shown in FIG. 5, has a folded end portion pivoted on a stud 551 screwed into a boss on the inside of the wall 23 of the frame 20. Beneath the hold-back pawl 550 is a bell-crank lifter-lever 553 pivoted at 554 to the end of an arm 555 fastened to the side wall 23 of the frame 20 by the stud 551. The lifter-lever 553 has a right-angular projection 556 at the end of its arm 557 which underlies the forward portion of the hold-back pawl 550 and is pierced with a hole for connecting a helical spring 558 thereto. The upper end of the spring 558 is fastened to a lug on the upstanding curved arm 559 of the pawl 550. When the arm 557 of the lifter-lever 553 is rocked downwardly to the position shown in FIG. 5, the pawl 550 will be yieldingly engaged with one of the teeth on the ratchet-wheel by the tension of the spring 558. Alternately, when the arm 557 of the lifter-lever 553 is rocked upwardly to its normal position, it will raise the pawl 550 clear of the teeth on the ratchet-wheel 505 to allow the latter to rotate clockwise and permit turning of the shaft 453 and gear 455 at its end. The rack-bar 451 will then be free to descend to allow the package P to move down into contact with the drive-roll 10 under the action of gravity.

The lifter-lever 553 is rocked into this last described relationship to maintain the pawl 550 disengaged from the teeth on the ratchet-wheel 505 by means of a link 560 connected to its downwardly-projecting arm. The lower end of the link 560 is connected to a relatively short lever 563 fast on the rock-shaft 524, previously mentioned. The rock-shaft 524 is rocked by means actuated by the reset lever of the machine as described in said Patent No. 2,764,362, and connected with detent-means for cocking and latching the stopping mechanism to continue the winding operation after the cop-tube or the package itself, as the case may be, is carried into driving engagement with the drive-roll.

The cylindrical face 516 of the disk 515 is employed as a brake-drum for snubbing the movement of the winding mandrel 24 away from the drive-roll 10 during the growth in diameter of the package. For this purpose it is engaged by a spring-pressed brake-shoe 570, shown in FIG. 5. The brake-shoe 570 is fastened by a screw 571 to the end of a relatively short lever 572 having its hub fast on the rock-shaft 435. A helical spring 573 having its end pocketed in a counterbore on the back of the lever 572 encircles a pin 574 supported by its end held in a block 575 fastened to the side wall 23 of the frame 20. The spring 573 acts on the lever 572 to press the brake-shoe 570 against the cylindrical face 516 of the disk 515 to apply frictional resistance to the turning of the disk and thereby the gear 455 which engages the rack-bar 451, see FIG. 2. Through this means the movement of the arm 26 is snubbed and effectually controlled to prevent the package P from vibrating or bouncing on the drive-roll 10 as it is rotated thereby during the winding operation.

The lever 572 is rocked by the lever 520 to release the brake-shoe 570 from the disk 515 so as to permit the shaft 453 and gear 455 to turn and allow the package to drop back into engagement with the drive-roll 10 in restarting the winding operation. Projecting from one side of the snubber-lever 572 is a lug 576, see dotted lines in FIG. 5, which is engaged by the edge of the lever 520 when the latter is released from the recess in the disk 515 in starting the winding operation. The lever 572 is also rocked to release the brake-shoe 570 during the shifting of the package from the drive-roll 10 to the rest 360 and from the rest to the reverse-roll 15 so that the package will be free to drop slightly during its transfer between the drive-roll and the reverse-roll. For this purpose the rock-shaft 435 has secured fast thereto a relatively long lever 580, see FIGS. 2 and 5, which has a downwardly-curved end portion terminating in a rounded point. The end of the lever 580 is adapted to be engaged by a pin 581 projecting from the side of the cam 365, shown by dotted lines in FIG. 2. Rotation of the cam 365 causes the pin 581 to lift the lever 580, whereby to rock the shaft 435 and release the lever 520 from the disk 515. As the lever 520 is released its edge will engage the lug 576 on the snubber-lever 572 and rock the latter to release the brake-shoe 570. This release of the brake-shoe 570 allows the shaft 453 and the gear 455 to turn freely for permitting the rack-bar 451 to descend slightly so that the package P can be shifted from the drive-roll 10 onto the rest 360, see FIG. 2. The release of the snubbing means is repeated as the package is shifted from the rest 360 to the reverse roll 15, this action being effected as the pin 581 engages with the angularly-disposed edge 583 of the lever 580 to lift it again.

The lever 580 has a still further function to assist in the resetting of the package-lifting means. At the rearward end of the lever 580 is a tail-piece 584 formed with a right-angular projection or lug 585 which is positioned above the rearward end of the trigger 525, see FIG. 5. When the shaft 435 is rocked contraclockwise so as to rock the lever 580 the lug 585 will be located slightly above the end of the trigger 525. Consequently, when the shaft 524 is rocked clockwise to rock the anvil 533 and trigger 525 the rearward end of the trigger will be elevated to contact the lug 585 and be held from further movement in position for its detent-shoulder 535 to positively engage with the ear 534 on the anvil 533 for re- connecting these parts in latched relationship as shown in FIG. 6.

To prepare the winding unit for operation a cop-tube or package-core C is placed on the winding mandrel or holder 24 and secured in place to rotate therewith about the spindle 25. The yarn y from a bobbin or other suitable source of supply, supported therebelow but not herein illustrated, is drawn up and entered in the guide slot 45 of the end-plate 42 on the tension-assembly generally designated by the numeral 40 and fully described in the prior cited Patent No. 2,764,362. From the tension-assembly 40 the yarn is entered between the blades of the dual slub-catchers 95, and under the lower edge of the guide-plate 115, thence above the crossbar 633 of a breakage lever 625 and under the horizontal portion of the wire guide 116. The yarn is then led upwardly to a winding unit of the type disclosed in Patent No. 2,764,362.

It will be understood that when the machine is prepared for winding the spindle-carrying arm 26 will be in elevated position with the winding mandrel 24 raised above the drive-roll 10 so that the cop-tube C is free from contact therewith. After the machine has been prepared for winding and the starting or reset lever 590 depressed in the manner described in Patent No. 2,764,362 it will act through the instrumentalities shown in FIG. 6 to release the ratchet-wheel 505 so that the shaft 453 and its gear 455 can turn to allow the rack-bar 451, see FIG. 2, to descend and lower the winding mandrel 24 for the cop-tube C to make contact with the drive-roll 10. This action is accomplished by the rocking of the shafts 435 and 524 in the manner as explained above. When the shaft 435 is rocked in contraclockwise direction, as viewed in FIG. 6, the angular end 521 will be withdrawn from the shoulder 518 in the recess of the disk 515 and as the lever 520 rocks rearwardly it will engage the lug 576 on the snubber-lever 572, see FIG. 6, to withdraw the brake-shoe 570 from the periphery of the disk 515. Simultaneously, as the shaft 524 is rocked to latch the detent-means, as previously explained, the lever 563 on said shaft will be rocked in clockwise direction as viewed in FIG. 5 whereby to cause the link 560 to operate the bell-crank lifter-lever 553 in clockwise direction about its pivot 554. The lifter-lever 553 will thus be caused to engage under the hold-back pawl 550 to raise the latter and release it from the teeth on the ratchet-wheel 505. As the hold-back pawl 550 and snubber brake-shoe 570 are released the shaft 453 will be free to turn so that the weight of the arm 25 and the winding mandrel 24, see FIGS. 1 and 2, will cause the arm to descend by gravity to slide the rack-bar 451 downwardly in its casing 452 as it rotates the gear 455. As soon as the surface of the cop-tube C makes contact with the periphery of the drive-roll 10 it will be caused to rotate to wind on the yarn, and meanwhile the strand will be received in one of the grooves 14 of the roll to traverse it back and forth and deposit the yarn in helical coils on the cop-tube; it having been stated that the drive-roll 10 is rotated continuously by the shaft 11 driven from the power-means at the end of the gang machine.

As the yarn is deposited in layers on the cop-tube C the winding mandrel 24 recedes from the drive-roll 10 during the growth in diameter of the winding package as permitted by the swinging of the arm 26 about its pivot on the stud-shaft 29, see FIG. 2. It has been stated that the upward movement of the winding mandrel during the growth of the package is controlled by the snubbing action of the brake-shoe 570. After the starting or reset lever 590 has been depressed to latch the detent-means it is released and returned upwardly to a slight extent to allow the lever 520 to ride back into position with its projection 521 bearing against the periphery of the disk 515, which in the meantime has been turned back to first position as the cop-tube C descends into contact with the drive-roll 10. During this motion the lever 520 moves away from the lug 576 on the snubber-lever 572 to release the latter and cause its spring 573, see FIG. 5, to press the brake-shoe 570 against the periphery of the disk 515 to resist any vibration of the arm 26 and thereby prevent the winding package from jumping or bouncing on the drive-roll 10.

When the shaft 524 is rocked in contraclockwise direction as viewed in FIG. 6, and the arm 537 on the safety lever 536 is free from the anvil 533, the trigger 525 will be rocked to raise its ledge or shelf 528. Then when the oscillator 500 has been swung to the position shown in this last mentioned view the pin 510 on the tail of the pawl 506 will be engaged under the shelf 528 to thereby rock the pawl 506 and engage it with one of the teeth on the ratchet-disk 505. Consequently, at the next motion of the oscillator 500 its depending portion 507 will actuate the pawl 506 to advance the ratchet-disk 505 in contraclockwise direction as viewed in FIG. 6. Meanwhile, the link 560 connected to the lever 563, see FIG. 5, will rock the lifter-pawl 553 contraclockwise to release the hold-back pawl 550 and permit it to engage the teeth on the ratchet-disk 505 so as to prevent retrogressive turning of the shaft 453 on which the disk is fast. The shaft 453 will therefore be rotated contraclockwise as viewed in FIG. 6 to turn the gear 455, see FIG. 2, and slide the rack-bar 451 upwardly. It has been explained that the lever 450 is connected to the package-carrying arm 26 through the bearing 28 so that the upward movement of the rack-bar will lift the package P off from the drive-roll 10 to arrest the winding operation. It will be understood that during this last-explained operation the projection 521 on the arm 520 is riding on the cylindrical periphery of the disk 515 since the recess in its edge has not been advanced at this point to allow the projection 521 to drop into said recess. The winding operation is thus arrested when the end-finding and knot-tying means fail to join the ends of the yarn during the repeat operation. The winding unit must then be tended manually to correct the difficulty; whereafter the machine may be started again by depressing the reset-lever 590 to restore the automatic mechanism to operative condition.

When the package P reaches the predetermined size the projection 521 on the curved lever 520 will drop into the recess on the disk 515 to rock the shaft 435 and a sizing lever as fully explained in Patent No. 2,764,362. The rocking of the shaft 524 operates the means in the prior cited United States Patent No. 2,764,362 to cause the pawl 506 to turn the ratchet-disk 505 and thereby rotate the gear 455 for sliding the rack-bar 451 upwardly. The lever 450 connected to the rack-bar 451 will thus be swung upwardly to raise the arm 26 and lift the package P off from the drive-roll 10.

*Adjusting the Machine for Packages of Different Size*

It has been explained that to control the size of the package P to be wound the lever 450, see FIG. 2, is adjusted angularly in relation to the package-carrying arm 26 so that the upward sliding movement of the rack bar 451 will turn the gear 455 and shaft 453 for rotating the disk 515, shown in FIG. 5, to a position to allow the projection 521 on the lever 520 to enter the recess in the disk and engage with the shoulder 518. It will be understood that this adjustment is made by raising the arm 26 above the drive-roll 10 in proportion to the diameter of the package P when completed. With the disk 515 in the position shown in FIG. 6 the rack-bar 451 will be in its upper position as shown in FIG. 2 with the lever 450 held raised. The screw 36 is first unscrewed to release the bushings 35, see FIG. 2, from engagement with the sleeve 33 to free the package-carrying arm 26 for turning its bearing 28 on the sleeve. The arm 26 is then adjusted in height to locate the surface of the cop-tube C a certain distance from the periphery of the drive-roll 10 in proportion to the diameter of the package to be produced. This may be accomplished by using a measuring gauge between the periphery of the drive-roll 10 and the surface of the cop-tube C. The reset lever 590 may then be manually depressed to disengage the lever 520 from the shoulder 518 on the disk 515 while also rocking the snubber-lever to release the brake-shoe 570 and allow the disk 515 and ratchet-disk 505 to rotate in clockwise direction for sliding the bar 451 downwardly so as to lower the arm 26 and place the cop-tube C in surface contact with the drive-roll 10.

After each package is completed it is removed from the winding mandrel 24, a new cop-tube C applied thereto, the supply yarn attached to the cop-tube and the machine started to operate again by manually depressing the reset lever 590 to lower the cop-tube into contact with the drive-roll 10. The machine will then operate as previously explained to wind a new package with the end-finding and knot-tying mechanism functioning automatically as required.

While the machine is herein shown and described as embodied in a preferred form of construction, modifications may be made in the structure and arrangement of its mechanisms within the scope of the invention as expressed in the following claims. Therefore, without limiting ourselves in this respect, we claim:

1. In a winding machine having means for rotatably supporting a package, a drive-roll for rotating the package to wind yarn thereon, means for lifting the package to release it from the drive-roll, a gear for operating the lifting means, a ratchet-disk for rotating said gear, a continuously-oscillated member, a pawl carried by said member normally free from engagement with the teeth on the ratchet-disk, detent-means normally engaged during the operation of the machine, means to release the detent-means when the package reaches a predetermined size, and means operative upon release of the detent-means to engage the pawl with the teeth on the ratchet-disk to cause said disk to be rotated by the continuously-oscillated member whereby to turn the gear and lift the package off from the drive-roll.

2. In a winding machine having means for rotatably supporting a package, a continuously-rotated drive-roll for rotating the package by peripheral contact therewith, means for lifting the package off from the drive-roll to arrest its rotation, a gear for operating said means, a ratchet-disk for turning said gear, a second disk rotatable with the ratchet-disk and formed with a recess in its periphery, a resiliently-operated sizing lever bearing against the periphery of the second disk and engageable in the recess thereof when said disk is turned to a predetermined extent, a pawl for rotating the ratchet-disk, means for oscillating the pawl, said pawl normally disengaged from the teeth on the ratchet-disk, and means operated by the sizing lever to engage the pawl with the ratchet-disk when the end of the sizing lever enters the recess in the second disk.

3. In a winding machine having means for rotatably supporting a package, a drive-roll for rotating the package by surface contact therewith, a rack-bar for lifting the package off from the drive-roll to arrest its rotation, a gear for sliding the rack-bar, a ratchet-disk for turning said gear, a second disk rotatable with the ratchet-disk and formed with a recess in its periphery, a sizing lever bearing against the periphery of the second disk to adapt it to enter the recess in its periphery when said second disk is turned to a predetermined extent, a pawl normally disengaged from the teeth on the ratchet-disk, means operated by the sizing lever to engage the pawl with the teeth on the ratchet-disk when said lever enters the recess in the second disk, and means for actuating the pawl to turn the ratchet-disk and rotate the gear to slide the rack-bar for raising the package off from the drive-roll.

4. In a winding machine having a spindle for rotatably supporting a package and a drive-roll for rotating the package by surface contact therewith, the combination of means for lifting the package off from the drive-roll when it reaches a predetermined size including a disk rotatable by the movement of the winding spindle away from the drive-roll during the growth in the winding, said disk having a recess in its periphery, a sizing lever engaging the periphery of said disk to adapt it to enter the recess therein when the disk is turned to a predetermined extent, a ratchet-disk rotatable with the first-named disk, an oscillating member, a pawl carried by said member normally free from engagement with the teeth on said ratchet-disk, and means actuated by the sizing lever when it enters the recess in the first-named disk to engage the pawl with the teeth on the ratchet-disk to turn the latter to lift the package off from the drive-roll.

5. In a winding machine having a spindle for rotatably supporting a package and a drive-roll for rotating the package to wind yarn thereon, the combination of a rotatable disk having a recess in its periphery, means movable by the winding spindle during its recession from the drive-roll to rotate said disk, a sizing lever engaging the periphery of said disk to adapt its end to enter the recess therein when the disk is turned to a predetermined extent, a ratchet-disk rotatable with the first-named disk, a continuously oscillated member, a pawl carried by said member normally free from engagement with the teeth on the ratchet-disk, an anvil, a trigger normally locked to the anvil, and means actuated by the sizing lever when its end enters the recess in the first-mentioned disk to release the trigger from the anvil and engage the pawl with the teeth on the ratchet-disk for turning said disk to raise the package off from the drive-roll and arrest the winding operation.

References Cited in the file of this patent
UNITED STATES PATENTS

| | | |
|---|---|---|
| 952,015 | McKean | Mar. 15, 1910 |
| 1,755,148 | Cunniff | Apr. 15, 1930 |